Dec. 12, 1944.                    M. SALDIN                    2,364,874

SPRING TIRE FOR VEHICLES

Filed Aug. 26, 1943

INVENTOR.
Max Saldin
BY
Zoltan Holachek
ATTORNEY

Patented Dec. 12, 1944

2,364,874

UNITED STATES PATENT OFFICE 2,364,874

SPRING TIRE FOR VEHICLES

Max Saldin, Brooklyn, N. Y.

Application August 26, 1943, Serial No. 500,037

3 Claims. (Cl. 152—261)

This invention relates to new and useful improvements in a tire for vehicle wheels.

More particularly, the invention proposes a new tire which eliminates the necessity of a pneumatic inner tube.

Specifically, the new tire is characterized by a closely wound helical spring coiled into annular form and associated with certain holding elements.

The invention proposes the use of a plurality of rings within said spring and extending around said annular form and secured to the turns of the spring with wire lacing or other similar elements.

Another object of the invention is to provide the helical spring with concave inner and outer strips of stiff flexible material extending around the inner and outer diameters thereof and secured in position with wire lacing along the sides or with other similar elements.

A flexible casing is also contemplated to engage over the said concave strips and helical spring.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
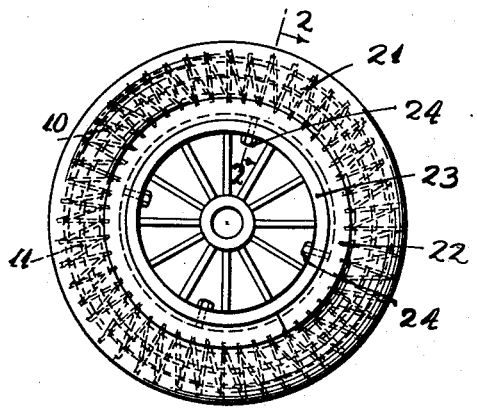
Fig. 1 is a side elevational view of a wheel provided with a tire constructed in accordance with this invention.
Figure 2:
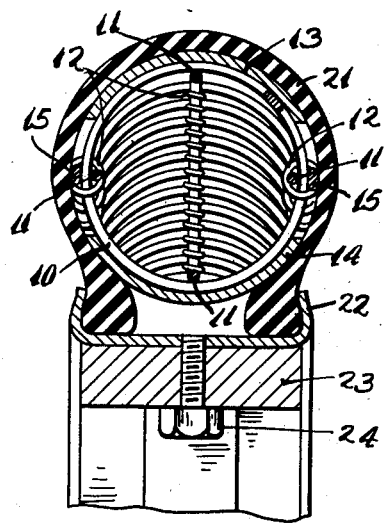
Fig. 2 is a fragmentary enlarged sectional view taken on the line 2—2 of Fig. 1.
Figure 3:
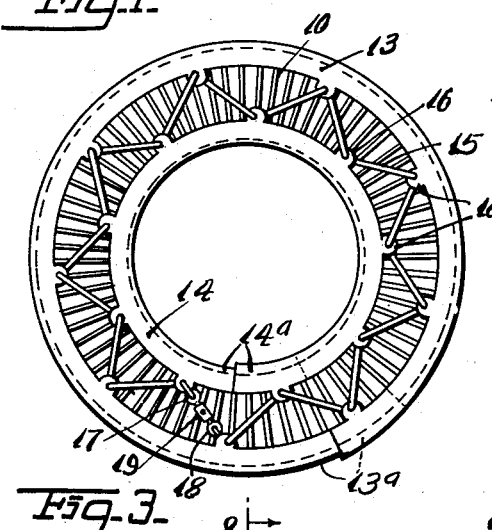
Fig. 3 is a side elevational view of the helical spring and concave strips and associated elements.
Figure 4:
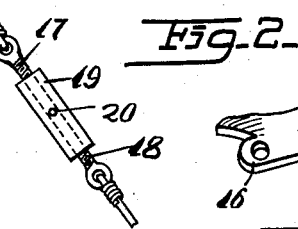
Fig. 4 is a fragmentary enlarged detailed view of a portion of Fig. 3.
Figure 5:
Fig. 5 is a perspective view of the edge portion of one of the concave strips.
Figure 6:
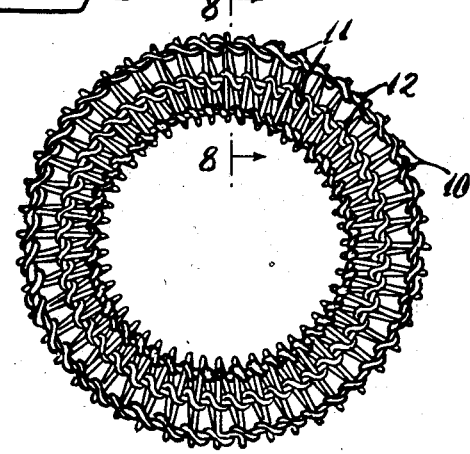
Fig. 6 is a side elevational view of the helical spring and the holding rings.
Figure 7:
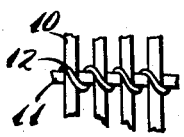
Fig. 7 is a fragmentary enlarged detailed view of a portion of Fig. 6.
Figure 8:
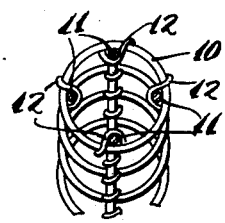
Fig. 8 is a fragmentary sectional view taken on the line 8—8 of Fig. 6.

The tire for wheels, in accordance with this invention, includes a closely wound helical spring 10 which is coiled around into annular form. A plurality of rings 11 are disposed within the spring 10 and extend around said annular formation. As illustrated on the drawing there are four of these holding rings 11 equally spaced from each other. Wire lacing 12 connects the turns of the spring 10 with the said rings 11.

A concave outer strip 13 of stiff flexible material, such as sheet metal, extends around the outer diameter of the spring 10. The end portions 13a of said strip 13 overlap. A concave inner strip 14 of flexible material, such as sheet metal, extends around the inner diameter of the spring 10. This strip has end portions 14a which overlap. Wire laces 15 connect adjacent edges of the concave strips 13 and 14. More particularly, the edges of the concave strips 13 and 14 are formed with lugs 16 through which the wire laces 15 pass. The ends of the laces 15 are connected with right and left hand screws 17 and 18, respectively, which threadedly engage a tubular coupling 19. This tubular coupling 19 is formed with radially extending openings 20 into which a turning tool may be engaged for turning the coupling to draw the screws together.

A flexible casing 21 engages over the strips 13 and 14 and forms a covering. This flexible casing is disclosed as constructed of rubber material though it may as well be constructed of other flexible soft materials. The casing 21 is illustrated mounted in an annular flanged rim 22 which is mounted on a wheel 23. Fastening elements 24 connect the rim of the wheel 23 with the flanged rim 22.

An important feature of this invention resides in the fact that the tire does not require air for inflation. Moreover, the casing 21 need not be of rubber, which is very scarce at the present time.

The outer strip 13 of the tire is preferably made of a wide center portion and two narrower hinged portions so that the tire may be removed from the hub of the wheel by merely collapsing the narrow side portions.

It is to be understood that the closely wound helical spring 10 may be sold in long tubular forms and cut down to the desired length in order to fit the hub or outside diameter of the particular wheel on which it is to be mounted.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A tire for wheels, comprising a closely wound helical spring coiled into annular form, a plurality of rings within said spring and extending around said annular form, wire lacing connecting the turns of said spring and said rings together, a concaved outer strip of stiff flexible material extending around the outer diameter of said spring, a concaved inner strip of stiff flexible material extending around the inner diameter of said spring, wire laces connecting adjacent edges of said concaved strips together, and a flexible casing engaging over said strips, said strips of flexible materials having lugs along their edges through which said wire lacings pass.

2. A tire for wheels, comprising a closely wound helical spring coiled into annular form, a plurality of rings within said spring and extending around said annular form, wire lacing connecting the turns of said spring and said rings together, a concaved outer strip of stiff flexible material extending around the outer diameter of said spring, a concaved inner strip of stiff flexible material extending around the inner diameter of said spring, wire laces connecting adjacent edges of said concaved strips together, and a flexible casing engaging over said strips, the ends of said wire lacings being connected with right and left hand screws which threadedly engage tubular couplings.

3. A tire for wheels, comprising a closely wound helical spring coiled into annular form, a plurality of rings within said spring and extending around said annular form, wire lacing connecting the turns of said spring and said rings together, a concaved outer strip of stiff flexible material extending around the outer diameter of said spring, a concaved inner strip of stiff flexible material extending around the inner diameter of said spring, wire laces connecting adjacent edges of said concaved strips together, and a flexible casing engaging over said strips, the ends of said wire lacings being connected with right and left hand screws which threadedly engage tubular couplings, said couplings having openings for a tool by which they may be turned.

MAX SALDIN.